(12) United States Patent
Kishimoto et al.

(10) Patent No.: US 9,040,452 B2
(45) Date of Patent: May 26, 2015

(54) CARBON CATALYST, METHOD OF PRODUCING SAME, AND ELECTRODE AND BATTERY EACH UTILIZING SAME

(71) Applicants: NATIONAL UNIVERSITY CORPORATION GUNMA UNIVERSITY, Maebashi-shi, Gunma (JP); NISSHINBO HOLDINGS INC., Tokyo (JP)

(72) Inventors: Takeaki Kishimoto, Funabashi (JP); Mikiko Imada, Tokushima (JP); Jun-ichi Ozaki, Kiryu (JP)

(73) Assignees: NATIONAL UNIVERSITY CORPORATION GUNMA UNIVERSITY, Maebashi-shi (JP); NISSHINBO HOLDINGS INC., Tokyo (JP)

( * ) Notice: Subject to any disclaimer, the term of this patent is extended or adjusted under 35 U.S.C. 154(b) by 0 days.

(21) Appl. No.: 14/024,222

(22) Filed: Sep. 11, 2013

(65) Prior Publication Data

US 2014/0011672 A1   Jan. 9, 2014

Related U.S. Application Data

(62) Division of application No. 13/505,068, filed as application No. PCT/JP2010/069567 on Nov. 4, 2010, now Pat. No. 8,569,207.

(30) Foreign Application Priority Data

Nov. 5, 2009   (JP) ................................. 2009-254057

(51) Int. Cl.
*B01J 20/00*   (2006.01)
*H01M 4/90*   (2006.01)

(52) U.S. Cl.
CPC .............. *H01M 4/9083* (2013.01); *H01M 4/90* (2013.01); *Y02E 60/50* (2013.01)

(58) Field of Classification Search
CPC ...... H01M 4/90; H01M 4/9083; Y02E 60/50; B01J 20/18
USPC ......................................... 429/231.8; 502/417
See application file for complete search history.

(56) References Cited

U.S. PATENT DOCUMENTS 5,447,896 A * 9/1995 Rao ................................ 502/184
2003/0175580 A1  9/2003 Ozaki et al.
(Continued)

FOREIGN PATENT DOCUMENTS

JP   A-2000-306582   11/2000
JP   A-2002-226210   8/2002
(Continued)

OTHER PUBLICATIONS

English machine translation of JP2008-282725.*
(Continued)

*Primary Examiner* — Richard M Rump
(74) *Attorney, Agent, or Firm* — Oliff PLC

(57) ABSTRACT

Provided is a method of producing a carbon catalyst having an improved activity. The method of producing carbon catalyst including a carbonization step of carbonizing raw materials containing an organic compound as a carbon source, a metal, and an electrically conductive carbon material to produce a carbonized material; a metal impregnation step of impregnating the carbonized material with a metal; and a heat treatment step of subjecting the carbonized material impregnated with the metal to a heat treatment.

7 Claims, 3 Drawing Sheets

(56) References Cited

U.S. PATENT DOCUMENTS

| | | | |
|---|---|---|---|
| 2008/0076008 | A1 | 3/2008 | Ozaki et al. |
| 2010/0323272 | A1 | 12/2010 | Ozaki et al. |

FOREIGN PATENT DOCUMENTS

| | | |
|---|---|---|
| JP | A-2003-249231 | 9/2003 |
| JP | A-2003-272624 | 9/2003 |
| JP | 2007-026746 A | 2/2007 |
| JP | 2007-273371 A | 10/2007 |
| JP | A-2008-282725 | 11/2008 |
| WO | WO 02/29836 A1 | 4/2002 |
| WO | WO 2009/098812 A1 | 8/2009 |

OTHER PUBLICATIONS

Feb. 1, 2011 International Search Report issued in Application No. PCT/JP2010/069567 (with translation).

Jun. 12, 2012 International Preliminary Report on Patentability issued in Application No. PCT/JP2010/069567.

Kannari et al., "Influences of structural defects of carbon on activities for oxygen reduction reaction and $CO_2$ gasification," *Abstracts of 35th Annual Meeting of the Carbon Society of Japan*, Nov. 28, 2008, pp. 130-131.

Li et al., "Influence of CO-evolving groups on the activity of activated carbon fiber for $SO_2$ removal," *Fuel Processing Technology*, Jul. 2001, pp. 151-158, vol. 70, No. 3.

Ozaki et al., "Enhancement of oxygen reduction activity of nanoshell carbons by introducing nitrogen atoms from metal phthalocyanines," *Electrochimica Acta*, Oct. 21, 2009, pp. 1864-1871, vol. 55, No. 6.

Niwa et al., "X-ray absorption analysis of nitrogen contribution to oxygen reduction reaction in carbon alloy cathode catalysts for polymer electrolyte fuel cells," *Journal of Power Sources*, Feb. 1, 2009, pp. 93-97, vol. 187, No. 1.

Lyth et al., "Carbon Nitride as a Nonprecious Catalyst for Electrochemical Oxygen Reduction," *Journal of Physical Chemistry C*, Oct. 28, 2009, pp. 20148-20151, vol. 113, No. 47.

Maass et al., Carbon support oxidation in PEM fuel cell cathodes, Journal of Power Sources, vol. 176, Issue 2, Feb. 1, 2008, pp. 444-451, ISSN 0378-7753, 10.1016/j.jpowsour.2007.08.053. (http://www.sciencedirect.com/science/article/pii/S0378775307016084).

Haydar et al., Regularities in the temperature-programmed desorption spectra of CO2 and CO from activated carbons, Carbon, vol. 38, Issue 9, 2000, pp. 1297-1308, ISSN 0008-6223, 10.1016/S0008-6223(99)00256-0.

Aug. 5, 2014 Office Action issued in Chinese Application No. 201080050109.6 (with English Translation).

Sawai et al., "Heat-Treated Transition Metal Hexacyanometallates as Electrocatalysts for Oxygen Reduction Insensitive to Methanol," Journal of the Electrochemical Society, 2004, A682-A688, vol. 151(5).

Bezerra et al., "A review of Fe-N/C and Co-N/C catalysts for the oxygen reduction reaction," Electrochimica Acta, 2008, 4937-4951, vol. 53.

Nallathambi et al., "Development of high performance carbon composite catalyst for oxygen reduction reaction in PEM Proton Exchange Membrane fuel cells," Journal of Power Sources, 2008, 34-42, vol. 183.

Dec. 3, 2014 extended European Search Report issued in European Application No. 10828299.7.

Dec. 16, 2014 Office Action for Japanese Patent Application No. 2011-539376.

C. Bezerra, et al., "A review of Fe-N/C and Co-N/C catalysts for the oxygen reduction reaction," Electrochimica Acta 53 (2008) 4937-4951.

P. Matter et al., "The role of nanostructure in nitrogen-containing carbon catalysts for the oxygen reduction reaction," Journal of Catalysts 239 (2006) 83-96.

V. Nallathambi et al., "Development of high performance carbon composite catalyst for oxygen reduction reaction in PEM Proton Exchange Membrane fuel cells," Journal of Power Sources 183 (2008) 34-42.

Dec. 2, 2013 Office Action issued in Chinese Patent Application No. 20108005019.6 (with partial translation).

Feb. 3, 2015 Office Action in Chinese Application No. 201080050109.6.

\* cited by examiner

FIG.1

CARBONIZATION — S1

METAL IMPREGNATION — S2

HEAT TREATMENT — S3

FIG.2

| | CARBON CATALYST | OCV(V) | 0.2-A VOLTAGE(V) | $E_{o2}(V)$ | NUMBER OF ELECTRONS INVOLVED IN REACTION |
|---|---|---|---|---|---|
| COMPARATIVE EXAMPLE 1 | PCoAW | 0.75 | 0.58 | 0.782 | 3.6 |
| COMPARATIVE EXAMPLE 2 | PCoHNO$_3$ | 0.76 | 0.58 | 0.783 | 3.6 |
| EXAMPLE 1 | PCoFe | 0.80 | 0.60 | 0.799 | 3.8 |
| EXAMPLE 2 | PCoZr | 0.83 | 0.61 | 0.792 | 3.8 |
| EXAMPLE 3 | PCoFeAW | 0.91 | 0.66 | 0.826 | 3.8 |
| EXAMPLE 4 | CoFeAW | 0.92 | 0.66 | 0.861 | 3.9 |
| EXAMPLE 5 | PCoFe(II)AW | 0.87 | 0.64 | 0.803 | 3.8 |
| EXAMPLE 6 | PCoFeAWFe | 0.89 | 0.65 | 0.800 | 3.8 |
| EXAMPLE 7 | PCoFeAWZr | 0.98 | 0.70 | 0.837 | 3.8 |
| EXAMPLE 8 | PCoFeAWTi | 0.96 | 0.69 | 0.819 | 3.8 |
| EXAMPLE 9 | PCoFeAWCe | 0.95 | 0.68 | 0.810 | 3.8 |
| EXAMPLE 10 | PCoFeAWHNO$_3$ | 0.94 | 0.69 | 0.832 | 3.8 |
| EXAMPLE 11 | PCoFeAWR | 0.92 | 0.67 | 0.830 | 3.9 |
| EXAMPLE 12 | PCoFeAWNH$_3$ | 0.96 | 0.77 | 0.860 | 3.9 |

FIG.3

| | CARBON CATALYST | 400°C | | 900°C | |
|---|---|---|---|---|---|
| | | CO(mmol) | $CO_2$(mmol) | CO(mmol) | $CO_2$(mmol) |
| COMPARATIVE EXAMPLE 1 | PCoAW | 0.007 | 0.006 | 0.243 | 0.072 |
| COMPARATIVE EXAMPLE 3 | KB | 0.004 | 0.007 | 0.122 | 0.025 |
| EXAMPLE 3 | PCoFeAW | 0.013 | 0.064 | 0.353 | 0.158 |
| EXAMPLE 4 | CoFeAW | 0.032 | 0.112 | 0.675 | 0.257 |
| EXAMPLE 7 | PCoFeAWZr | 0.025 | 0.072 | 0.531 | 0.193 |
| EXAMPLE 10 | PCoFeAWH$NO_3$ | 0.018 | 0.067 | 0.400 | 0.160 |
| EXAMPLE 12 | PCoFeAWN$H_3$ | 0.037 | 0.125 | 0.682 | 0.277 |

FIG.4

| | CARBON CATALYST | AVERAGE La(nm) | AVERAGE Lc(nm) | AVERAGE NUMBER OF STACKS |
|---|---|---|---|---|
| COMPARATIVE EXAMPLE 1 | PCoAW | 1.11 | 0.65 | 2.92 |
| COMPARATIVE EXAMPLE 3 | KB | 1.84 | 0.52 | 2.50 |
| EXAMPLE 3 | PCoFeAW | 1.89 | 0.74 | 3.16 |
| EXAMPLE 4 | CoFeAW | 1.92 | 0.51 | 2.50 |
| EXAMPLE 10 | PCoFeAWH$NO_3$ | 1.84 | 0.70 | 3.06 |

CARBON CATALYST, METHOD OF PRODUCING SAME, AND ELECTRODE AND BATTERY EACH UTILIZING SAME

This is a Division of application Ser. No. 13/505,068 filed Apr. 30, 2012, which in turn is a National Stage of International Application No. PCT/JP2010/069567 filed Nov. 4, 2010, which claims priority to Japanese Application No. 2009-254057 filed Nov. 5, 2009. The disclosures of the prior applications are hereby incorporated by reference herein in their entireties.

TECHNICAL FIELD

The present invention relates to a carbon catalyst, a method of producing a carbon catalyst, and an electrode and a battery each using the carbon catalyst, and more particularly, to an improvement in an activity of a carbon catalyst.

BACKGROUND ART

A platinum catalyst is currently used in a number of chemical reactions and next-generation batteries. However, there still remain many problems to be solved as described below. For example, in a polymer electrolyte fuel cell (PEFC), the use of platinum results in an increased cost, and reserves of platinum are limited. In addition, in an air cell, the use of platinum results in an increased cost in the same manner as described above, and a chemical reaction such as decomposition of an electrolyte solution is caused by platinum. Therefore, the use of platinum is a major obstacle to widespread adoption of the next-generation batteries.

In view of the foregoing, for example, a carbon catalyst as described in Patent Literature 1 has been developed as an alternative catalyst to platinum.

PRIOR ART DOCUMENT

Patent Document

[Patent Document 1] JP 2008-282725 A

DISCLOSURE OF THE INVENTION

Problems to be Solved by the Invention

However, a fuel cell using the conventional carbon catalyst has insufficient performance compared to one using the platinum catalyst.

The present invention has been made in view of the problems. An object of the present invention is to provide a carbon catalyst having an improved activity, a method of producing a carbon catalyst, and an electrode and a battery each using the carbon catalyst.

Means for Solving the Problems

In a carbon catalyst according to an embodiment of the present invention for achieving the object, the total of a desorption amount of carbon monoxide and a desorption amount of carbon dioxide in a temperature programmed desorption method from 150° C. to 400° C. is 0.06 mmol or more per 0.02 g. According to the present invention, there is provided a carbon catalyst having an improved activity.

In addition, the desorption amount of carbon monoxide may be 0.01 mmol or more and the desorption amount of carbon dioxide may be 0.05 mmol or more.

A carbon catalyst according to an embodiment of the present invention for achieving the object is obtained by: carbonizing raw materials containing an organic compound as a carbon source, a metal, and an electrically conductive carbon material to produce a carbonized material; impregnating the carbonized material with a metal; and subjecting the carbonized material with the metal to a heat treatment. According to the present invention, there is provided a carbon catalyst having an improved activity.

An electrode according to an embodiment of the present invention for achieving the object includes any one of the carbon catalysts. According to the present invention, there is provided an electrode including a carbon catalyst having an improved activity.

A battery according to an embodiment of the present invention for achieving the object includes the electrode. According to the present invention, there is provided a battery including an electrode including a carbon catalyst having an improved activity.

A method of producing a carbon catalyst according to an embodiment of the present invention for achieving the object includes: a carbonization step of carbonizing raw materials containing an organic compound as a carbon source, a metal, and an electrically conductive carbon material to produce a carbonized material; a metal impregnation step of impregnating the carbonized material with a metal; and a heat treatment step of subjecting the carbonized material impregnated with the metal to a heat treatment. According to the present invention, there is provided a method of producing a carbon catalyst having an improved activity.

In addition, the metal impregnation step may include impregnating the carbonized material with a metal of a kind different from the metal in the raw materials. In addition, the heat treatment step may include heating the carbonized material at 300° C. or more.

A carbon catalyst according to an embodiment of the present invention for achieving the object is produced by any one of the methods. According to the present invention, there is provided a carbon catalyst having an improved activity.

Effect of the Invention

According to the present invention, a carbon catalyst having an improved activity, a method of producing a carbon catalyst, and an electrode and a battery each using the carbon catalyst are provided.

BRIEF DESCRIPTION OF THE DRAWINGS

FIG. 1 is an explanatory diagram illustrating main steps in an example of a method of producing a carbon catalyst according to an embodiment of the present invention.

FIG. 2 is an explanatory diagram illustrating an example of results of evaluation of characteristics of a carbon catalyst in an embodiment of the present invention.

FIG. 3 is an explanatory diagram illustrating an example of results of evaluation of a carbon catalyst by a temperature programmed desorption method in an embodiment of the present invention.

FIG. 4 is an explanatory diagram illustrating an example of results of evaluation of a carbon structure of a carbon catalyst in an embodiment of the present invention.

MODE FOR CARRYING OUT THE INVENTION

Figure 5:
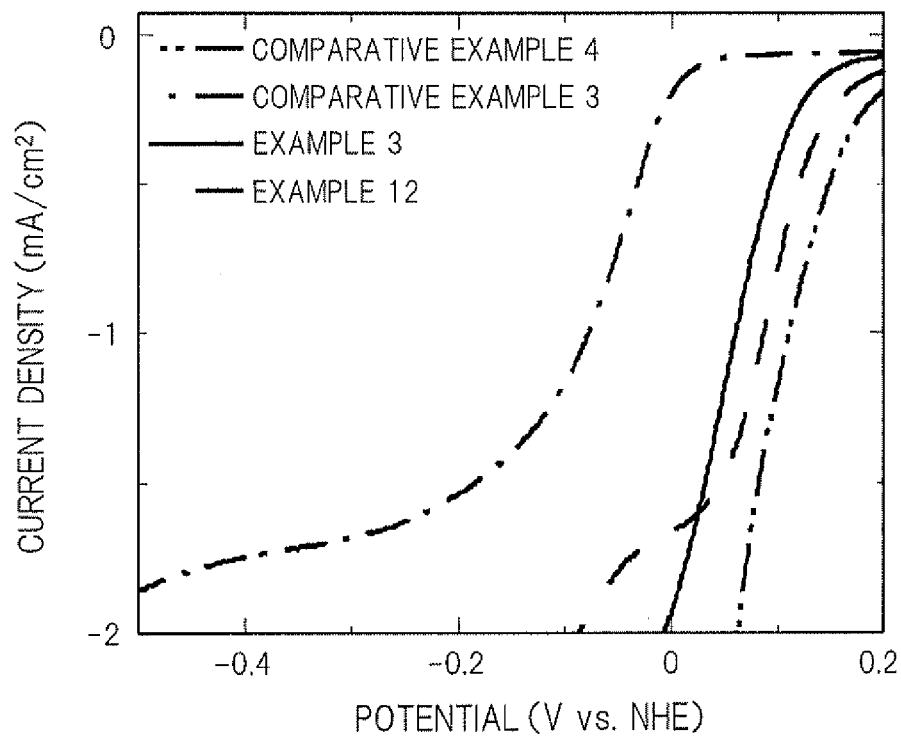
FIG. 5 is an explanatory diagram illustrating an example of results of evaluation of an oxygen reduction activity of a carbon catalyst in an embodiment of the present invention.

Hereinafter, an embodiment of the present invention is described. It should be noted that the present invention is not limited to an example described in this embodiment.

First, a method of producing a carbon catalyst according to this embodiment (hereinafter, referred to as "production method of the present invention") is described. FIG. 1 is an explanatory diagram illustrating main steps in an example of the production method of the present invention. As illustrated in FIG. 1, the production method of the present invention includes a carbonization step S1, a metal impregnation step S2, and a heat treatment step S3.

In the carbonization step S1, raw materials containing an organic compound as a carbon source, a metal, and an electrically conductive carbon material are carbonized so that a carbonized material is obtained. The organic compound in the raw materials is not particularly limited as long as the compound is carbonized, and one or two or more kinds of arbitrary compounds may be used. That is, one or both of a high-molecular weight organic compound (e.g., a resin such as a thermoplastic resin or a thermosetting resin) and a low-molecular weight organic compound may be used as the organic compound, and biomass may also be used.

In addition, for example, an organic compound containing nitrogen may be preferably used as the organic compound. The organic compound containing nitrogen is not particularly limited as long as the compound contains a nitrogen atom in a molecule thereof, and one or two or more kinds of arbitrary compounds may be used.

In addition, for example, a ligand that coordinates to a metal may be preferably used as the organic compound. That is, in this case, an organic compound containing one or more ligand atoms in a molecule thereof is used. More specifically, for example, an organic compound containing, as a ligand atom, one or two or more kinds selected from the group consisting of a nitrogen atom, phosphorus atom, an oxygen atom, and a sulfur atom in a molecule thereof may be used. For example, an organic compound containing, as a ligand group, one or two or more kinds selected from the group consisting of an amino group, a phosphino group, a carboxyl group, and a thiol group in a molecule thereof may also be used.

Specifically, for example, one or two or more kinds selected from the group consisting of pyrrole, vinylpyridine, imidazole, 2-methylimidazole, aniline, a polysulfone, a polyaminobismaleimide, a polyimide, a polyvinyl alcohol, a polybenzoimidazole, a polyimide, a polyether, a polyetheretherketone, cellulose, lignin, chitin, chitosan, silk, wool, a polyamino acid, a nucleic acid, DNA, RNA, hydrazine, hydrazide, urea, an ionomer, a polyacrylic acid, a polyacrylic acid ester, a polymethacrylic acid ester, a polymethacrylic acid, a phenol resin, a melamine resin, an epoxy resin, a furan resin, a polyamideimide resin, and a polyacrylonitrile may be used as the organic compound.

The organic compound may further contain, for example, one or two or more kinds selected from the group consisting of boron, phosphorus, oxygen, and sulfur as a component for improving the activity of the carbon catalyst to be produced by the production method of the present invention.

The metal in the raw materials is not particularly limited as long as the metal does not inhibit the activity of the carbon catalyst to be produced by the production method of the present invention, and one or two or more kinds of arbitrary metals may be used. The metal may be, for example, one or two or more kinds selected from the group consisting of Groups 3 to 16 of the periodic table. That is, one or two or more kinds selected from the group consisting of Group 3A (Group 3) element, Group 4A (Group 4) element, Group 5A (Group 5) element, Group 6A (Group 6) element, Group 7A (Group 7) element, Group 8 (Groups 8, 9, and 10) element, Group 1B (Group 11) element, Group 2B (Group 12) element, Group 3B (Group 13) element, Group 4B (Group 14) element, Group 5B (Group 15) element, and Group 6B (Group 16) element of the periodic table may be used.

In addition, for example, a transition metal (belonging to Groups 3 to 12 of the periodic table) may be preferably used as the metal. In addition, a metal belonging to the fourth period of Groups 3 to 12 of the periodic table may be preferably used as the transition metal.

Specifically, for example, one or two or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (e.g., cerium (Ce)), and actinoids may be preferably used, and one or two or more kinds selected from the group consisting of manganese, iron, cobalt, nickel, and copper may be more preferably used.

The metal may be used as the simple substance of the metal or a compound of the metal. For example, a metal salt, a metal oxide, a metal hydroxide, a metal nitride, a metal sulfide, a metal carbide, or a metal complex may be used as the metal compound. Of those, a metal salt, a metal oxide, a metal sulfide, or a metal complex may be preferably used. It should be noted that when a ligand is used as the organic compound, a metal complex is to be formed in the raw materials.

The electrically conductive carbon material in the raw materials is not particularly limited as long as the material imparts electrical conductivity to the carbon catalyst to be produced by the production method of the present invention or improves the electrical conductivity of the carbon catalyst, and one or two or more kinds of arbitrary materials may be used. That is, for example, a carbon material that has electrical conductivity but does not have any catalytic activity by itself may be used as the electrically conductive carbon material.

Specifically, for example, one or two or more kinds selected from the group consisting of carbon black, carbon nanotube, carbon nanohorn, carbon fiber, carbon fibril, and a graphite powder may be used.

The use of each of those electrically conductive carbon materials may increase the contact area at the three-phase interface of a carbon structure of a carbonized material to improve the activity of the carbon catalyst to be produced by the production method of the present invention, for example.

Electrically conductive carbon material that has been caused to carry the metal in the raw materials in advance may also be used. That is, in this case, for example, an electrically conductive carbon material carrying a transition metal that improves the activity or oxidation resistance of the carbon catalyst may be used. As the transition metal, for example, one or two or more kinds selected from the group consisting of scandium, titanium, vanadium, chromium, manganese, iron, cobalt, nickel, copper, zinc, yttrium, zirconium, niobium, molybdenum, ruthenium, rhodium, palladium, lanthanoids (e.g., cerium), and actinoids may be used.

In the carbonization step S1, prior to the carbonization, the raw materials containing such organic compound, metal, and electrically conductive carbon material as described above are mixed. A method of mixing the raw materials is not particularly limited, and for example, a mortar or a stirring apparatus may be used. One or two or more kinds of mixing methods such as powder mixing involving mixing the organic compound, the metal, and the electrically conductive carbon material in powdery states, and solvent mixing involving adding and mixing, a solvent may also be employed.

Then, in the carbonization step S1, the raw materials prepared as described above are carbonized. That is, the raw materials are heated and held at such a predetermined temperature that the raw materials are carbonized (carbonization temperature).

The carbonization temperature is not particularly limited as long as the raw materials are carbonized at the temperature, and for example, the temperature may be 300° C. or more. More specifically, for example, the carbonization temperature may be 300° C. or more and 1,500° C. or less, may be preferably 400° C. or more and 1,200° C. or less, and may be more preferably 500° C. or more and 1,100° C. or less.

A rate of temperature increase upon heating of the raw materials to the carbonization temperature is not particularly limited and may be, for example, 0.5° C./min or more and 300° C./min or less. The time period for which the raw materials are held at the carbonization temperature (carbonization time) is not particularly limited as long as the raw materials are carbonized within the time period, and for example, the time may be 5 minutes or more. More specifically, for example, the carbonization time may be 5 minutes or more and 240 minutes or less, and may be preferably 20 minutes or more and 180 minutes or less. In addition, the carbonization is preferably performed in an inert gas such as nitrogen (e.g., in a flow of the inert gas).

Thus, in the carbonization step S1, the carbonized material produced by the carbonization of the raw materials is obtained. It should be noted that the resultant carbonized material may be pulverized. A method of pulverizing the carbonized material is not particularly limited, and for example, a pulverizing apparatus such as a ball mill or a bead mill may be used. For example, the average particle diameter of the carbonized material after the pulverization may be 150 μm or less, and may be preferably 45 μm or less. In consideration of an application to a membrane electrode assembly (MEA), the average particle diameter of the carbonized material is preferably as small as possible.

In the subsequent metal impregnation step S2, the carbonized material obtained in the carbonization step S1 is impregnated with a metal. The metal with which the carbonized material is impregnated is not particularly limited as long as the metal does not inhibit the activity of the carbon catalyst to be produced by the production method of the present invention, and one or two or more kinds of arbitrary metals may be used.

The metal may be, for example, one or two or more kinds selected from the group consisting of Groups 3 to 16 of the periodic table. In addition, for example, a transition metal (belonging to Groups 3 to 12 of the periodic table) may be preferably used as the metal. Further, a metal belonging to the fourth period, fifth period, or sixth period of Groups 3 to 12 of the periodic table may be preferably used as the transition metal.

Specifically, for example, one or two or more kinds selected from the group consisting of titanium, chromium, manganese, iron, cobalt, nickel, copper, zinc, zirconium, niobium, molybdenum, ruthenium, lanthanum, cerium, and tantalum may be preferably used, and one or two or more kinds selected from the group consisting of titanium, iron, zirconium, ruthenium, and cerium may be more preferably used.

In addition, in the metal impregnation step S2, the carbonized material may be impregnated with a metal of a kind different from the metal in the raw materials used in the carbonization step S1. That is, for example, the carbonized material may be impregnated with one or two or more kinds selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead or from the group consisting of titanium, iron, zirconium, ruthenium, and cerium, and different from the metal in the raw materials.

The metal may be used as the simple substance of the metal or a compound of the metal. For example, a metal salt, a metal oxide, a metal hydroxide, a metal nitride, a metal sulfide, a metal carbide, or a metal complex may be used as the metal compound. Of those, a metal salt, a metal oxide, a metal sulfide, or a metal complex may be preferably used.

A method of impregnating the carbonized material with the metal in the metal impregnation step S2 is not particularly limited as long as at least the surface of the carbonized material is impregnated with the metal, and for example, a method involving bringing the carbonized material into contact with a solution containing the metal may be employed.

That is, the carbonized material may be impregnated with the metal by, for example, immersing and holding the carbonized material in a metal-containing solution. In this case, the carbonized material may be held in the boiling metal-containing solution. In addition, an acidic solution may be used as the metal-containing solution. In this case, the pH of the metal-containing solution may be, for example, 1 or more and 6 or less.

In the subsequent heat treatment step S3, the carbonized material that has been impregnated with the metal in the metal impregnation step S2 is subjected to a heat treatment. The heat treatment is performed by holding the carbonized material at a predetermined temperature (heat treatment temperature).

That is, in the heat treatment step S3, the carbonized material is heated at, for example, 300° C. or more. The heat treatment temperature may be, for example, 400° C. or more. More specifically, for example, the heat treatment temperature may be 300° C. or more and 1,500° C. or less, may be preferably 400° C. or more and 1,400° C. or less, and may be more preferably 500° C. or more and 1,300° C. or less.

The heat treatment temperature may be the same temperature as the carbonization temperature, or may be a temperature different from the carbonization temperature. That is, for example, the heat treatment temperature may be a temperature equal to or lower than the carbonization temperature of the raw materials in the carbonization step S1, or may be a temperature lower than the carbonization temperature. Alternatively, the heat treatment temperature may be a temperature higher than the carbonization temperature.

Specifically, for example, when the carbonization temperature in the carbonization step S1 is 400° C. or more and 1,100° C. or less, the heat treatment temperature may be a temperature that is 300° C. or more and 1,000° C. or less, and is equal to or lower than the carbonization temperature or is lower than the carbonization temperature.

A rate of temperature increase upon heating of the carbonized material to the heat treatment temperature is not particularly limited and may be, for example, 0.5° C./min or more and 300° C./min or less. The time period for which the carbonized material is held at the heat treatment temperature (heat treatment time) is not particularly limited as long as an effect of the heat treatment is obtained within the time, and for example, the time may be 5 minutes or more. More specifically, for example, the heat treatment time may be 5 minutes or more and 240 minutes or less, and may be preferably 20 minutes or more and 180 minutes or less. In addition, the heat treatment is preferably performed in an inert gas such as nitrogen (e.g., in a flow of the inert gas).

Thus, in the heat treatment step S3, the carbonized material subjected to the heat treatment after the impregnation with the metal is obtained. It should be noted that the resultant carbonized material may be pulverized. A method of pulverizing the carbonized material is not particularly limited, and for example, a pulverizing apparatus such as a ball mill or a bead mill may be used. For example, the average particle diameter of the carbonized material after the pulverization may be 150 µm or less, and may be preferably 45 µm or less. In consideration of an application to a membrane electrode assembly, the average particle diameter of the carbonized material is preferably as small as possible.

It should be noted that in the production method of the present invention, nitrogen atoms or boron atoms may also be introduced (doped) into the carbonized material in an arbitrary step. That is, for example, nitrogen atoms or boron atoms may be introduced into the carbonized material obtained in the carbonization step S1, the carbonized material after the metal impregnation obtained in the metal impregnation step S2, and/or the carbonized material after the heat treatment obtained in the heat treatment step S3. For example, a vapor phase doping method such as an ammoxidation method or a CVD method, a liquid phase doping method, or a vapor phase-liquid phase doping method may be employed as a method of introducing nitrogen atoms or boron atoms. Specifically, for example, a nitrogen atom may be introduced into the surface of the carbonized material by: mixing a nitrogen source such as ammonia, melamine, or acetonitrile or a boron source such as boric acid or sodium borohydride with the carbonized material; and holding the resultant mixture in an atmosphere of an inert gas such as nitrogen, argon, or helium at a temperature of 550° C. or more and 1,200° C. or less for a time period of 5 minutes or more and 180 minutes or less. In addition, the resultant carbonized material may be subjected to an activating treatment such as carbon dioxide activation, phosphoric acid activation, alkali activation, hydrogen activation, ammonia activation, activation with nitrogen oxide, or electrolytic activation and/or liquid phase oxidation such as nitric acid oxidation, mixed acid oxidation, or hydrogen peroxide oxidation.

In the production method of the present invention, the carbonized material obtained in the heat treatment step S3 may be obtained as a carbon catalyst. According to the production method of the present invention including the carbonization step S1, the metal impregnation step S2, and the heat treatment step S3 as described above, a carbon catalyst having an improved activity compared with a conventional one is produced. That is, the production method of the present invention effectively improves the activity of the carbon catalyst by including, in particular, the metal impregnation step S2 and the heat treatment step S3.

Although a carbonized material having a catalytic activity is obtained in the carbonization step S1 in the production method of the present invention, the catalytic activity is significantly improved by further subjecting the carbonized material to a metal impregnation treatment and a heat treatment.

The mechanism via which the activity of the carbon catalyst is improved by the metal impregnation treatment and the heat treatment may be, for example, that a new carbon structure different from a carbon structure formed by the carbonization is formed by the metal impregnation treatment and the heat treatment.

It should be noted that while the metal in the raw materials may be placed not only on the surface of the carbonized material but also in the entirety of the inside thereof while being dispersed therein, the metal with which the carbonized material has been impregnated in the metal impregnation step S2 is locally placed mainly on the surface of the carbonized material and a vicinity thereof.

Therefore, it may be said that the metal impregnation treatment and the heat treatment each have an aspect of a surface treatment for the carbonized material. In terms of the foregoing as well, the carbon structure formed by the metal impregnation treatment and the heat treatment may be different from the carbon structure formed by the carbonization.

In addition, in the production method of the present invention, a treatment for removing a metal in the carbonized material (metal removal treatment) may be performed as required (for example, when the metal becomes unnecessary after the carbonization).

That is, the production method of the present invention may further include: a metal removal step of subjecting the carbonized material subjected to the heat treatment in the heat treatment step S3 to a metal removal treatment; and an after-metal removal heat treatment step of subjecting the carbonized material subjected to the metal removal treatment to a heat treatment.

The metal removal treatment is not particularly limited as long as a metal in the carbonized material is removed or the amount of the metal is reduced by the treatment, and for example, a washing treatment with an acid or an electrolytic treatment may be performed.

The acid to be used in the acid washing is not particularly limited as long as an effect of the metal removal treatment is obtained, and one or two or more kinds of arbitrary acids may be used. That is, for example, one or two or more kinds selected from the group consisting of hydrochloric acid (such as concentrated hydrochloric acid), nitric acid (such as concentrated nitric acid), and sulfuric acid (such as concentrated sulfuric acid) may be used. When two or more kinds of acids are used, for example, a mixed acid prepared by mixing concentrated hydrochloric acid and concentrated nitric acid at a predetermined volume ratio (such as aqua regia), or a mixed acid prepared by mixing concentrated nitric acid and concentrated sulfuric acid at a predetermined volume ratio may be used.

The acid washing method is not particularly limited as long as the effect of the metal removal treatment is obtained, and for example, a method involving immersing and holding the carbonized material in a solution containing an acid may be employed. In this case, the carbonized material may be held in the boiling acid solution.

In the subsequent after-metal removal heat treatment step, the same heat treatment as the heat treatment in the heat treatment step S3 is performed. Thus, in the after-metal removal heat treatment step, a carbonized material subjected to the heat treatment after the metal removal is obtained. It should be noted that the resultant carbonized material may be pulverized as in the carbonized material subjected to the heat treatment in the heat treatment step S3.

In addition, in the production method of the present invention, the carbonized material obtained in the after-metal removal heat treatment step may be obtained as a carbon catalyst. A carbon catalyst having an additionally improved activity is produced by performing such metal removal treatment and after-metal removal heat treatment. That is, in this case, the activity of the carbon catalyst is effectively improved by, for example, removing a metal component from the carbonized material to expose an active site.

It should be noted that in the production method of the present invention, the metal impregnation treatment may be performed in the metal impregnation step S2 after the carbonized material obtained in the carbonization step S1 has been subjected to such metal removal treatment as described above. That is, in this case, in the metal impregnation step S2, the carbonized material from which the metal in the raw materials has been removed is impregnated with the metal. Alternatively, the metal impregnation treatment may be performed without subjecting the carbonized material to the metal removal treatment. That is, in this case, in the metal impregnation step S2, the carbonized material is impregnated with the metal without the removal of the metal in the raw materials from the carbonized material.

Alternatively, the production method of the present invention may further include: an additional metal impregnation step of further impregnating the carbonized material subjected to the heat treatment in the heat treatment step S3 with a metal; and an additional heat treatment step of subjecting the carbonized material impregnated with the metal in the additional metal impregnation step to a heat treatment. That is, the production method of the present invention includes, for example, the carbonization step S1, the metal impregnation step S2, the heat treatment step S3, the additional metal impregnation step, and the additional heat treatment step.

In the additional metal impregnation step, the metal with which the carbonized material is impregnated is not particularly limited as long as the metal does not inhibit the activity of the carbon catalyst to be produced by the production method of the present invention, and one or two or more kinds of arbitrary metals may be used.

The metal may be, for example, one or two or more kinds selected from the group consisting of Groups 3 to 16 of the periodic table. In addition, for example, a transition metal (belonging to Groups 3 to 12 of the periodic table) may be preferably used as the metal. Further, a metal belonging to the fourth period, fifth period, or sixth period of Groups 3 to 12 of the periodic table may be preferably used as the transition metal.

Specifically, for example, one or two or more kinds selected from the group consisting of titanium, chromium, manganese, iron, cobalt, nickel, copper, zinc, zirconium, niobium, molybdenum, ruthenium, lanthanum, cerium, and tantalum may be preferably used, and one or two or more kinds selected from the group consisting of titanium, iron, zirconium, ruthenium, and cerium may be more preferably used.

In addition, in the additional metal impregnation step, the carbonized material may be impregnated with a different kind of metal from the metal in the raw materials used in the carbonization step S1. That is, for example, the carbonized material may be impregnated with one or two or more kinds selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead or from the group consisting of titanium, iron, zirconium, ruthenium, and cerium, and different from the metal in the raw materials.

In addition, in the additional metal impregnation step, the carbonized material may be impregnated with a different kind of metal from the metal with which the material has been impregnated in the metal impregnation step S2. That is, for example, the carbonized material may be impregnated with one or two or more kinds selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead, or from the group consisting of titanium, iron, zirconium, ruthenium, and cerium, and different from the metal with which the carbonized material has been impregnated in the metal impregnation step S2. In addition, in the additional metal impregnation step, the carbonized material may be impregnated with a different kind of metal from the metal with which the material has been impregnated in the metal impregnation step S2, the metal being capable of having a valence of 4. That is, in this case, for example, the carbonized material is impregnated with a divalent or trivalent metal in the metal impregnation step S2, and then the carbonized material is impregnated with a tetravalent metal in the additional metal impregnation step.

The metal may be used as the simple substance of the metal or a compound of the metal. For example, a metal salt, a metal oxide, a metal hydroxide, a metal nitride, a metal sulfide, a metal carbide, or a metal complex may be used as the metal compound. Of those, a metal salt, a metal oxide, a metal sulfide, or a metal complex may be preferably used.

A method of impregnating the carbonized material with the metal in the additional metal impregnation step is not particularly limited as long as at least the surface of the carbonized material is impregnated with the metal, and for example, a method involving bringing the carbonized material into contact with a solution containing the metal may be employed.

That is, the carbonized material may be impregnated with the metal by, for example, immersing and holding the carbonized material in a metal-containing solution. In this case, the carbonized material may be held in the boiling metal-containing solution. In addition, an acidic solution may be used as the metal-containing solution. In this case, the pH of the metal-containing solution may be, for example, 1 or more and 6 or less.

In the subsequent additional heat treatment step, the same heat treatment as the heat treatment in the heat treatment step S3 is performed. It should be noted that a heat treatment temperature in the additional heat treatment step may be the same temperature as the heat treatment temperature in the heat treatment step S3, or may be a temperature different from the heat treatment temperature.

Thus, in the additional heat treatment step, a carbonized material subjected to the heat treatment after the additional metal impregnation treatment is obtained. It should be noted that the resultant carbonized material may be pulverized as in the carbonized material subjected to the heat treatment in the heat treatment step S3. In addition, in the production method of the present invention, the additional metal impregnation step and the additional heat treatment step may each be repeated twice or more.

In addition, in the production method of the present invention, the carbonized material obtained in the additional heat treatment step may be obtained as a carbon catalyst. A carbon catalyst with an additionally improved activity is produced by performing such additional metal impregnation treatment and additional heat treatment. That is, in this case, the activity of the carbon catalyst is effectively improved by, for example, further forming a new carbon structure.

Alternatively, the production method of the present invention may further include the additional metal impregnation step and the additional heat treatment step, and the metal removal step and the after-metal removal heat treatment step. That is, the production method of the present invention includes, for example, the carbonization step S1, the metal impregnation step S2, the heat treatment step S3, the metal removal step, the after-metal removal heat treatment step, the additional metal impregnation step, and the additional heat treatment step.

In this case, in the additional metal impregnation step, the carbonized material subjected to the metal removal treatment and the after-metal removal heat treatment after the heat treatment in the heat treatment step S3 is impregnated with a metal again. When the additional metal impregnation step and the additional heat treatment step are each repeated twice or more, the carbonized material after the heat treatment in each additional heat treatment step may be subjected to a metal removal treatment and an after-metal removal heat treatment.

Alternatively, the production method of the present invention may further include: an acid treatment step of subjecting the carbonized material subjected to the heat treatment in the heat treatment step S3 to an acid treatment; and an after-acid treatment heat treatment step of subjecting the carbonized material subjected to the acid treatment to a heat treatment. That is, the production method of the present invention includes, for example, the carbonization step S1, the metal impregnation step S2, the heat treatment step S3, the acid treatment step, and the after-acid treatment heat treatment step.

An acid to be used in the acid treatment is not particularly limited as long as an effect of the acid treatment is obtained, and one or two or more kinds of arbitrary acids may be used. That is, for example, one or two or more kinds selected from the group consisting of hydrochloric acid (such as concentrated hydrochloric acid), nitric acid (such as concentrated nitric acid), and sulfuric acid (such as concentrated sulfuric acid) may be used. When two or more kinds of acids are used, for example, a mixed acid prepared by mixing concentrated hydrochloric acid and concentrated nitric acid at a predetermined volume ratio (such as aqua regia), or a mixed acid prepared by mixing concentrated nitric acid and concentrated sulfuric acid at a predetermined volume ratio, may be used.

A method for the acid treatment is not particularly limited as long as the effect of the acid treatment is obtained, and for example, a method involving immersing and holding the carbonized material in a solution containing an acid may be employed. In this case, the carbonized material may be held in the boiling acid solution. It should be noted that the carbonized material may be subjected to an acid treatment by washing the carbonized material with an acid in the metal removal step. That is, the acid washing for metal removal may be a mode of the acid treatment as a surface treatment.

In the subsequent after-acid treatment heat treatment step, the same heat treatment as the heat treatment in the heat treatment step S3 is performed. Thus, in the after-acid treatment heat treatment step, a carbonized material subjected to the heat treatment after the acid treatment is obtained. It should be noted that the resultant carbonized material may be pulverized as in the carbonized material subjected to the heat treatment in the heat treatment step S3. In addition, in the production method of the present invention, the acid treatment step and the after-acid treatment heat treatment step may each be repeated twice or more.

In addition, in the production method of the present invention, the carbonized material obtained in the after-acid treatment heat treatment step may be obtained as a carbon catalyst. A carbon catalyst having an additionally improved activity is produced by performing such acid treatment and after-acid treatment heat treatment. That is, in this case, the activity of the carbon catalyst is effectively improved by, for example, introducing a new functional group on the surface of the carbonized material and a vicinity thereof.

Alternatively, the production method of the present invention may further include the acid treatment step and the after-acid treatment heat treatment step, and the metal removal step and the after-metal removal heat treatment step. That is, the production method of the present invention includes, for example, the carbonization step S1, the metal impregnation step S2, the heat treatment step S3, the metal removal step, the after-metal removal heat treatment step, the acid treatment step, and the after-acid treatment heat treatment step.

In this case, in the acid treatment step, the carbonized material subjected to the metal removal treatment and the after-metal removal heat treatment after the heat treatment in the heat treatment step S3 is subjected to an acid treatment. When the acid treatment step and the after-acid treatment heat treatment step are each repeated twice or more, the carbonized material after the heat treatment in each after-acid treatment heat treatment step may be subjected to a metal removal treatment and an after-metal removal heat treatment.

Next, a carbon catalyst according to this embodiment (hereinafter, referred to as "catalyst of the present invention") is described. The inventors of the present invention have carried out extensive investigations on a carbon structure for realizing a carbon catalyst having a high activity on their own, in tandem with the method of producing a carbon catalyst as described above. As a result, the inventors have made an invention according to the catalyst of the present invention.

The catalyst of the present invention is, for example, such a carbon catalyst that the total of the desorption amount of carbon monoxide and the desorption amount of carbon dioxide in a temperature programmed desorption method from 150° C. to 400° C. is 0.06 mmol or more per 0.02 g. That is, when 0.02 g of the catalyst of the present invention is evaluated by the temperature programmed desorption method, the total amount of carbon monoxide and carbon dioxide to desorb during the heating of the catalyst of the present invention from 150° C. to 400° C. is 0.06 mmol or more.

In this case, the catalyst of the present invention may be, for example, such a carbon catalyst that in the temperature programmed desorption method from 150° C. to 400° C., the desorption amount of carbon monoxide is 0.01 mmol or more and the desorption amount of carbon dioxide is 0.05 mmol or more.

In addition, the total of the desorption amount of carbon monoxide and the desorption amount of carbon dioxide in the temperature programmed desorption method from 150° C. to 400° C. may be, for example, 0.07 mmol or more. In this case, for example, the desorption amount of carbon monoxide and the desorption amount of carbon dioxide may be 0.01 mmol or more and 0.06 mmol or more, respectively.

In addition, the catalyst of the present invention is, for example, such a carbon catalyst that the total of the desorption amount of carbon monoxide and the desorption amount of carbon dioxide in the temperature programmed desorption method from 150° C. to 900° C. is 0.4 mmol or more per 0.02 g. In this case, the catalyst of the present invention may be, for example, such a carbon catalyst that in the temperature programmed desorption method from 150° C. to 900° C., the desorption amount of carbon monoxide is 0.3 mmol or more and the desorption amount of carbon dioxide is 0.1 mmol or more.

In addition, the total of the desorption amount of carbon monoxide and the desorption amount of carbon dioxide in the temperature programmed desorption method from 150° C. to 900° C. may be, for example, 0.46 mmol or more per 0.02 g. In this case, for example, the desorption amount of carbon monoxide and the desorption amount of carbon dioxide may be 0.33 mmol, or more and 0.13 mmol or more, respectively.

The desorption amounts of carbon monoxide and carbon dioxide in the temperature programmed desorption method are determined by a known method. That is, first, a carbon catalyst is subjected to a heat treatment in a predetermined temperature programmed desorption apparatus so that a functional group (oxygen-containing compound) is desorbed from the surface of the carbon catalyst. Next, oxygen gas is brought into contact with the carbon catalyst subjected to the heat treatment so that the surface of the carbon catalyst is caused to chemically adsorb oxygen. After that, the carbon catalyst is subjected to a heat treatment again, and then the amounts of carbon monoxide and carbon dioxide to be generated in association with the desorption of the functional group (oxygen-containing compound) from the surface of the carbon catalyst are determined.

The desorption amount of carbon monoxide and the desorption amount of carbon dioxide in the temperature programmed desorption method from 150° C. to 400° C. or 900° C. are determined as the total amounts of carbon monoxide and carbon dioxide that have desorbed during a period commencing on the heating of a carbon catalyst to 150° C. and ending on such further heating of the carbon catalyst that its temperature increases to 400° C. or 900° C., respectively.

Such a temperature programmed desorption method is employed in the evaluation of a carbon material for its active surface area (ASA). That is, a carbon atom (edge carbon) on a carbon network surface in a carbon catalyst has been proved to be chemically active because the carbon atom has an unsaturated $sp^2$ electron.

The edge carbon is quantified by measuring the adsorption amount of an oxygen atom to the edge carbon, and the resultant quantity is an active surface area, which is regarded as a measure of the catalytic reactivity of the carbon catalyst. The temperature programmed desorption method is employed as a method of determining the active surface area.

As oxygen more easily adsorbs to an edge surface in the carbon catalyst than to its basal surface, the amount of the edge surface of the carbon catalyst is indirectly determined by: causing the carbon catalyst from which a surface functional group has been removed by heating at high temperatures to adsorb oxygen; heating the carbon catalyst again after the adsorption; and determining the release amounts (desorption amounts) of carbon monoxide and carbon dioxide. Therefore, increases in the desorption amounts of carbon monoxide and carbon dioxide measured by the temperature programmed desorption method represent an increase in the active surface area of the carbon catalyst, and also represent an increase in the catalytic activity of the carbon catalyst.

As a result of their extensive investigations, the inventors of the present invention have found on their own that the activity of a carbon catalyst is improved compared with a conventional one when the carbon catalyst has a carbon structure in which such desorption of carbon monoxide and carbon dioxide as described above occurs in the temperature programmed desorption method.

The catalyst of the present invention has larger desorption amounts of carbon monoxide and carbon dioxide measured by the temperature programmed desorption method than a conventional carbon catalyst does. Accordingly, it is considered that the catalyst of the present invention contains a large amount of edge surfaces, each having a large active surface area and high reactivity, and as a result, shows a higher catalytic activity than the conventional carbon catalyst does.

In addition, the catalyst of the present invention is, for example, a carbon catalyst obtained by carbonizing raw materials containing an organic compound as a carbon source, a metal, and an electrically conductive carbon material to produce a carbonized material, impregnating the carbonized material with a metal, and subjecting the carbonized material with the metal to a heat treatment.

In this case, the catalyst of the present invention may be preferably produced by the production method of the present invention as described above. That is, the catalyst of the present invention may be, for example, a carbon catalyst produced by the production method of the present invention including the carbonization step S1, the metal impregnation step S2, and the heat treatment step S3. In addition, the catalyst of the present invention in this case may be a carbon catalyst having a carbon structure in which such desorption of carbon monoxide and carbon dioxide as described above occurs in the temperature programmed desorption method.

For example, the specific surface area of the catalyst of the present invention measured by a nitrogen adsorption BET method may be 10 $m^2$/g or more, and may be preferably 100 $m^2$/g or more. More specifically, for example, the specific surface area of the catalyst of the present invention may be 200 $m^2$/g or more and 3,000 $m^2$/g or less, and may be preferably 300 $m^2$/g or more and 3,000 $m^2$/g or less.

The catalyst of the present invention has a catalytic activity such as an oxygen reduction activity. That is, the catalyst of the present invention effectively catalyzes an oxygen reduction reaction in an electrode for a fuel cell, for example.

The oxygen reduction activity may be evaluated, for example, with an oxygen reduction-starting potential. The oxygen reduction-starting potential may be determined, for example, based on data showing a relationship between a voltage and a current density obtained by potential sweep application with a rotating ring-disk electrode apparatus including a working electrode having applied thereto the catalyst of the present invention (oxygen reduction voltammogram).

In addition, the oxygen reduction-starting potential of the catalyst of the present invention may be, for example, 0.785 V vs. NHE (vs. a normal hydrogen electrode) or more and 1.2 V vs. NHE or less, and may be preferably 0.790 V vs. NHE or more and 1.2 V vs. NHE or less when evaluated in terms of a voltage ($E_{O2}$) at which a reduction current of −10 μA/$cm^2$ flows.

In addition, the catalytic activity of the catalyst of the present invention may be evaluated, for example, with the number of electrons involved in a reaction in an oxygen reduction reaction. The number of electrons involved in a reaction is calculated as the number of electrons involved in a reduction reaction for one molecule of oxygen in an oxygen reduction reaction to be catalyzed by the catalyst of the present invention.

That is, for example, in such a reaction that water is produced from protons and oxygen in a cathode (air electrode) of a fuel cell, four electrons are involved in a reduction reaction for one molecule of oxygen, in theory. In actuality, however, such a reaction that two electrons are involved in a reduction reaction for one molecule of oxygen to produce hydrogen peroxide also occurs in parallel. Thus, in the oxygen reduction reaction of the cathode, it is said that the number of electrons involved in the reduction reaction for one molecule of oxygen is preferably closer to 4 because a current is extracted in a larger amount, hydrogen peroxide is suppressed from being produced, and an environmental load and deterioration in a power generation apparatus is also reduced.

In this regard, according to the catalyst of the present invention, the number of electrons involved in a reaction in an oxygen reduction reaction may be 3.5 or more and 4 or less, may be preferably 3.6 or more, and may be more preferably 3.8 or more.

The catalyst of the present invention is a carbon catalyst having an excellent activity as described above, and hence is used as an alternative to an expensive platinum catalyst. That is, the catalyst of the present invention is formed of a carbonized material which not only has a high activity by itself without carrying any platinum catalyst but is also inexpensive and has a high practical value.

Thus, the catalyst of the present invention is utilized as, for example, a synthesis catalyst, an environmental catalyst, an electrode catalyst for a battery, an electrode catalyst for a fuel cell, an electrode catalyst for an air cell, or a hydrogen peroxide decomposition catalyst. According to the catalyst of the present invention, a variety of chemical reactions such as an oxygen reduction reaction are effectively promoted without the use of any platinum catalyst.

An electrode according to this embodiment (hereinafter, referred to as "electrode of the present invention") is an electrode including the catalyst of the present invention. That is, the electrode of the present invention is, for example, an electrode carrying the catalyst of the present invention. Specifically, the electrode of the present invention is, for example, an electrode including a predetermined electrode base material and the catalyst of the present invention carried by the electrode base material.

The electrode of the present invention may be, for example, an electrode for a fuel cell, and may be preferably an electrode for a polymer electrolyte fuel cell (PEFC). In addition, the electrode of the present invention may be, for example, an electrode for an air cell. When the electrode of the present invention is an electrode for a fuel cell or an electrode for an air cell, the electrode of the present invention is preferably a cathode.

That is, the catalyst of the present invention may be, for example, an electrode catalyst for a fuel cell, and may be preferably an electrode catalyst for a PEFC. In addition, the catalyst of the present invention may be, for example, an electrode catalyst for an air cell. Further, when the catalyst of the present invention is an electrode catalyst for a fuel cell or an electrode catalyst for an air cell, the catalyst of the present invention is preferably a cathode catalyst.

A battery according to this embodiment (hereinafter, referred to as "battery of the present invention") is a battery including the electrode of the present invention. That is, the battery of the present invention is a battery including the electrode of the present invention as one, or both, of a cathode and an anode.

The battery of the present invention may be, for example, a fuel cell, and may be preferably a PEFC. That is, the battery of the present invention may be, for example, a PEFC including a membrane electrode assembly including the electrode of the present invention. In addition, the battery of the present invention may be, for example, an air cell.

Specifically, the battery of the present invention may be, for example, a PEFC including a membrane electrode assembly of a polymer electrolyte membrane integrated with a cathode (positive electrode or air electrode) and an anode (negative electrode or fuel electrode) respectively formed on one side and the other side of the polymer electrolyte membrane, and including the electrode of the present invention as one, or both, of the cathode and the anode. In this case, the battery of the present invention preferably includes the electrode of the present invention at least as the cathode.

In addition, the battery of the present invention may be, for example, a fuel cell having an open circuit voltage (OCV) equal to or more than a predetermined value. That is, the battery of the present invention may be, for example, a fuel cell having an open circuit voltage of 0.78 V or more. Further, the open circuit voltage of the battery of the present invention may be, for example, 0.80 V or more, may be preferably 0.85 V or more, and may be more preferably 0.90 V or more.

In addition, the battery of the present invention may be a fuel cell having a voltage at a current density of 0.2 A/cm$^2$ (0.2-A voltage) of, for example, 0.59 V or more, preferably 0.60 V or more.

Next, a specific example according to this embodiment is described.

EXAMPLES

Example 1

Production of Carbon Catalyst PCoFe

First, a raw material as an object to be carbonized was prepared. That is, 1.5 g of a polyacrylonitrile-polymethacrylic acid copolymer (PAN/PMA) was dissolved in 30 mL of dimethylformamide. After that, 1.5 g of 2-methylimidazole and 1.5 g of cobalt chloride hexahydrate ($CoCl_2 \cdot 6H_2O$) were added to the solution, and then the mixture was stirred at room temperature for 2 hours. Ketjen black (ECP600JD manufactured by Lion Corporation) was added to the mixture thus obtained so as to account for 30 wt % of the solid content to be incorporated into the raw material, and then the contents were mixed with a mortar. The resultant mixture was vacuum-dried at 60° C. for 12 hours.

Further, the mixture was heated in the atmosphere so that its temperature was increased from room temperature to 150° C. in 30 minutes. Subsequently, the temperature was increased from 150° C. to 220° C. over 2 hours. After that, the mixture was held at 220° C. for 3 hours so that the mixture was made infusible. Thus, the raw material for a carbonized material was prepared.

Next, the carbonization of the raw material was performed. That is, the raw material subjected to the infusible treatment as described above was loaded into a quartz tube and subjected to nitrogen purge in an image furnace for 20 minutes, and then its temperature was increased from room temperature to 900° C. by heating over 18 minutes. After that, the raw material was held at 900° C. for 1 hour so as to be carbonized. Thus, a carbonized material was obtained.

Further, the carbonized material was pulverized. That is, zirconia balls each having a diameter of 10 mm were set in a planetary ball mill (P-7 manufactured by FRITSCH JAPAN CO., LTD.), and then a treatment for pulverizing the carbonized material with the planetary ball mill for 5 minutes at a rotational speed of 650 rpm was performed over 10 cycles. After that, the pulverized carbonized material was taken out and passed through a sieve having an aperture of 106 μm. The carbonized material that had passed through the sieve was obtained as a pulverized, fine particulate carbonized material.

Next, a metal impregnation treatment was performed. That is, a solution prepared by adding 2 g of iron (III) chloride hexahydrate ($FeCl_3 \cdot 6H_2O$) to 300 mL of distilled water was boiled, and then 2 g of the carbonized material was added to the iron-containing solution. Then, the carbonized material was impregnated with iron for 3 hours while being stirred in the iron-containing solution that was boiling. After that, the solution containing the carbonized material was filtered with a membrane filter (having a pore diameter of 1.0 μm and manufactured by Millipore), and then the filtrate was washed with distilled water until the filtrate became neutral. The recovered carbonized material was vacuum-dried at 60° C. for 12 hours. Further, the dried carbonized material was pulverized with a mortar.

Next, a heat treatment was performed. That is, the carbonized material subjected to the metal impregnation treatment as described above was loaded into a quartz tube and subjected to nitrogen purge in an image furnace for 20 minutes, and then its temperature was increased from room temperature to 700° C. by heating over 14 minutes. After that, the carbonized material was held at 700° C. for 1 hour.

Further, the carbonized material after the heat treatment was pulverized. That is, zirconia balls each having a diameter of 10 mm were set in a planetary ball mill, and then a treatment for pulverizing the carbonized material with the planetary ball mill for 5 minutes at a rotational speed of 450 rpm was performed over 4 cycles. After that, the pulverized carbonized material was taken out and passed through a sieve having an aperture of 106 μm. The carbonized material that had passed through the sieve was obtained as a pulverized, fine particulate carbon catalyst (PCoFe).

Example 2

Production of Carbon Catalyst PCoZr

A pulverized, fine particulate carbon catalyst (PCoZr) was obtained in the same manner as in Example 1 above except that zirconium chloride oxide octahydrate ($ZrCl_2O.8H_2O$) was used instead of iron(III) chloride hexahydrate ($FeCl_3.6H_2O$) in the metal impregnation treatment.

Example 3

Production of Carbon Catalyst PCoFeAw

The carbon catalyst (PCoFe) obtained in Example 1 above was subjected to a metal removal treatment by acid washing.

That is, 100 mL of concentrated hydrochloric acid was added to 1 g of the carbon catalyst (PCoFe), and then the mixture was stirred for 1 hour. After the carbon catalyst had been precipitated and the solution had been removed, 100 mL of a solution prepared by mixing concentrated hydrochloric acid and distilled water at 1:1 (volume ratio) was added to the carbon catalyst, and then the mixture was stirred for 1 hour. After the carbon catalyst had been precipitated and the solution had been removed, 100 mL of distilled water was added to the carbon catalyst, and then the mixture was stirred for 1 hour. The solution containing the carbon catalyst was filtered with a membrane filter (having a pore diameter of 1.0 μm and manufactured by Millipore), and then the filtrate was washed with distilled water until the filtrate became neutral. The recovered carbon catalyst was vacuum-dried at 60° C. for 12 hours. Further, the dried carbon catalyst was pulverized with a mortar.

Next, an after-metal removal heat treatment was performed. That is, the carbon catalyst subjected to the metal removal treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbonized material with the planetary ball mill for 5 minutes at a rotational speed of 450 rpm was performed 4 cycles. After that, the pulverized carbonized material was taken out and passed through a sieve having an aperture of 106 μm. The carbonized material that had passed through the sieve was obtained as a pulverized, fine particulate carbon catalyst (PCoFeAW).

Example 4

Production of Carbon Catalyst CoFeAW

A carbon catalyst (CoFeAW) was produced in the same manner as in Example 3 above except that the following raw material free of PAN/PMA was used as the raw material for a carbonized material.

That is, 1.5 g of 2-methylimidazole and 1.5 g of cobalt chloride hexahydrate ($CoCl_2.6H_2O$) were added to 30 mL of dimethylformamide, and then the mixture was stirred at room temperature for 2 hours. Ketjen black (ECP600JD, Lion Corporation) was added to the mixture thus obtained so as to account for 43 wt % of the solid content to be incorporated into the raw material, and then the contents were mixed with a mortar. The resultant mixture was vacuum-dried at 60° C. for 12 hours. The dried mixture was subjected to the same heating treatment as that in Example 1 above so that the raw material for a carbonized material was prepared. Then, the subsequent procedure was performed in the same manner as in Example 3 above. Thus, a pulverized, fine particulate carbon catalyst (CoFeAW) was obtained.

Example 5

Production of Carbon Catalyst PCoFe(II)AW

A pulverized, fine particulate carbon catalyst (PCoFe(II)AW) was obtained in the same manner as in Example 3 above except that iron(II) chloride tetrahydrate ($FeCl_2.4H_2O$) was used instead of iron(III) chloride in the metal impregnation treatment.

Example 6

Production of Carbon Catalyst PCoFeAWFe

The carbon catalyst (PCoFeAW) obtained in Example 3 above was subjected to an additional metal impregnation treatment. That is, a solution prepared by adding 2 g of iron (III) chloride hexahydrate ($FeCl_3.6H_2O$) to 300 mL of distilled water was boiled, and then 2 g of the carbon catalyst (PCoFeAW) was added to the iron-containing solution. Then, the carbon catalyst was impregnated with iron for 3 hours while being stirred in the iron-containing solution that was boiling. After that, the solution containing the carbon catalyst was filtered with a membrane filter (having a pore diameter of 1.0 μm and manufactured by Millipore), and then the filtrate was washed with distilled water until the filtrate became neutral. The recovered carbon catalyst was vacuum-dried at 60° C. for 12 hours. Further, the dried carbon catalyst was pulverized with a mortar.

Next, an additional heat treatment was performed. That is, the carbon catalyst subjected to the additional metal impregnation treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbon catalyst with the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed through the sieve was obtained as a pulverized, fine particulate carbon catalyst (PCoFeAWFe).

Example 7

Production of Carbon Catalyst PCoFeAWZr

A pulverized, fine particulate carbon catalyst (PCoFeAWZr) was obtained in the same manner as in Example 6 above except that zirconium chloride oxide octahydrate ($ZrCl_2O.8H_2O$) was used instead of iron(III) chloride hexahydrate ($FeCl_3.6H_2O$) in the additional metal impregnation treatment.

Example 8

Production of Carbon Catalyst PCoFeAWTi

A pulverized, fine particulate carbon catalyst (PCoFeAWTi) was obtained in the same manner as in Example 6 above except that a titanium(III) chloride solution ($TiCl_3$) was used instead of iron (III) chloride hexahydrate ($FeCl_3.6H_2O$) in the additional metal impregnation treatment.

Examples 9

Production of Carbon Catalyst PCoFeAWCe

A pulverized, fine particulate carbon catalyst (PCoFeAWCe) was obtained in the same manner as in Example 6 above except that cerium chloride heptahydrate ($CeCl_3.7H_2O$) was used instead of iron (III) chloride hexahydrate ($FeCl_3.6H_2O$) in the additional metal impregnation treatment.

Example 10

Preparation of Carbon Catalyst $PCoFeAWHNO_3$

The carbon catalyst (PCoFeAW) obtained in Example 3 above was subjected to an acid treatment. That is, 100 mL of concentrated nitric acid was added to 1 g of the carbon catalyst (PCoFeAW) and the mixture was stirred for 3 hours at normal temperature. After that, the solution containing the carbon catalyst was filtered with a membrane filter (having a pore diameter of 1.0 μm and manufactured by Millipore), and then the filtrate was washed with distilled water until the filtrate became neutral. The recovered carbon catalyst was vacuum-dried at 60° C. for 12 hours. Further, the dried carbon catalyst was pulverized with a mortar.

Next, an after-acid treatment heat treatment was performed. That is, the carbon catalyst subjected to the acid treatment as described above was loaded into a quartz tube and subjected to nitrogen purge in an image furnace for 20 minutes, and then its temperature was increased from room temperature to 700° C. by heating over 14 minutes. After that, the carbon catalyst was held at 700° C. for 1 hour.

Further, the carbon catalyst after the heat treatment was pulverized. That is, zirconia balls each having a diameter of 10 mm were set in a planetary ball mill, and then a treatment for pulverizing the carbon catalyst with the planetary ball mill for 5 minutes at a rotational speed of 450 rpm was performed over 4 cycles. After that, the pulverized carbon catalyst was taken out and passed through a sieve having an aperture of 106 μm. The carbon catalyst that had passed through the sieve was obtained as a pulverized, fine particulate carbon catalyst ($PCoFeAWHNO_3$).

Example 11

Production of Carbon Catalyst PCoFeAWR

A pulverized, fine particulate carbon catalyst (PCoFeAWR) was obtained in the same manner as in Example 10 above except that aqua regia (mixed acid prepared by mixing concentrated hydrochloric acid and concentrated nitric acid at a volume ratio of 3:1) was used instead of concentrated nitric acid in the acid treatment.

Example 12

Production of Carbon Catalyst $PCoFeAWNH_3$

A nitrogen atom was doped into the carbon catalyst (PCoFe) obtained in Example 1 above by subjecting the carbon catalyst to the same metal removal treatment by acid washing as that in Example 3 above and subjecting the carbon catalyst after the metal removal treatment to a heat treatment in an ammonia ($NH_3$) gas atmosphere.

That is, in the same manner as in Example 3 above, the carbon catalyst subjected to the metal removal treatment was loaded into a quartz tube and subjected to nitrogen purge in an image furnace for 20 minutes, and then its temperature was increased from room temperature to 800° C. by heating over 16 minutes. Then, the nitrogen gas atmosphere was changed to an ammonia gas atmosphere, and the carbon catalyst was held under the ammonia gas atmosphere at 800° C. for 30 minutes. Next, the ammonia gas atmosphere was changed to a nitrogen gas atmosphere again, and the carbon catalyst was held under the nitrogen gas atmosphere at 800° C. for 20 minutes. After that, the image furnace was left to stand to cool to room temperature. Further, the carbon catalyst after the nitrogen doping was pulverized in the same manner as in Example 3 above. Thus, a pulverized, fine particulate carbon catalyst ($PCoFeAWNH_3$) was obtained.

Comparative Example 1

Production of Carbon Catalyst PCoAW

A pulverized, fine particulate carbon catalyst (PCoAW) was obtained in the same manner as in Example 3 above except that none of the metal impregnation treatment, the heat treatment, and the pulverization treatment after the heat treatment were performed.

Comparative Example 2

Production of Carbon Catalyst $PCoHNO_3$

A pulverized, fine particulate carbon catalyst ($PCoHNO_3$) was obtained in the same manner as in Example 3 above except that none of the metal impregnation treatment, the heat treatment, and the pulverization treatment after the heat treatment were performed, and concentrated nitric acid was used instead of concentrated hydrochloric acid in the acid treatment.

Comparative Example 3

Preparation of Ketjen Black

Ketjen black (ECP600JD, Lion Corporation) as an electrically conducive carbon material was prepared as a carbonized material according to Comparative Example 3.

Comparative Example 4

Preparation of Carbon Material Carrying Platinum

A carbon material carrying platinum (Pt/C) obtained by causing ketjen black as a carrier to carry platinum at 40 wt % was prepared as a catalyst according to Comparative Example 4.

[Evaluation of Power Generation Performance, Oxygen Reduction Activity, and Number of Electrons Involved in Reaction in Fuel Cell]

First, a catalyst slurry containing any one of the carbon catalysts produced in Examples 1 to 12 and Comparative Examples 1 and 2 above was prepared. That is, 350 µL of a commercially available 5-wt % Nafion® solution (manufactured by Aldrich), 200 µL of ethanol, and 200 µL of distilled water were added to 0.1 g of the carbon catalyst, and the contents were mixed with a mortar. The resultant mixture was ultrasonicated for 1 hour. Thus, a catalyst slurry was obtained.

Then, a cathode for a fuel cell (cathode catalyst layer) carrying the carbon catalyst was produced. That is, the catalyst slurry was printed on a gas diffusion layer (manufactured by Toray Industries, Inc.) in two divided portions with a commercially available coater and dried at 60° C. for 3 hours. Thus, a cathode catalyst layer was obtained. The size of the cathode catalyst layer was 2.3 cm×2.3 cm. The amount of the carbon catalyst carried in the resultant cathode catalyst layer was 3 mg/cm$^2$.

Next, a membrane electrode assembly (MEA) including the carbon catalyst was produced. That is, the cathode catalyst layer, a solid polymer electrolyte membrane (Nafion® NRE212), and an anode catalyst layer (commercially available gas diffusion layer with carbon carrying platinum at 0.5 wt %) were stacked in this order and hot-pressed at 150° C. and 0.4 MPa for 3 minutes. Thus, an MEA was obtained.

Further, a fuel cell including the MEA was produced. That is, the MEA obtained as described above was sandwiched with a separator. Thus, a fuel cell was produced.

Then, the MEA including the carbon catalyst was evaluated for its power generation performance as described below. That is, hydrogen (80° C., a relative humidity of 100%) and oxygen (80° C., air having a relative humidity of 100%) were supplied to the anode side and the cathode side of the fuel cell, respectively. A back pressure was set to 0.1 MPa and a cell temperature was set to 80° C. Then, an open circuit voltage (OCV) and a voltage in power generation at a current density of 0.2 A/cm$^2$ (0.2-A voltage) obtained under the above-mentioned conditions were each measured.

In addition, the oxygen reduction activity was evaluated. That is, the catalyst slurry was aspirated with a pipette and applied onto a disk electrode (diameter: 5 mm) of a rotating ring-disk electrode apparatus (RRDE-1 SC-5 manufactured by Nikko Keisoku), followed by drying. Thus, a working electrode was produced. In addition, a platinum electrode was used as a ring electrode. 0.5 M sulfuric acid aqueous solution having dissolved therein oxygen at normal temperature was used as an electrolyte solution.

Next, the electrodes were rotated at a rotational speed of 1,500 rpm, and a current density during potential sweep at a sweep speed of 0.5 mV/sec was recorded as a function of a potential. Then, from the resultant polarization curve, a voltage at which a reduction current of −10 µA/cm$^2$ flowed was recorded as an oxygen reduction-starting potential ($E_{O2}$) Further, the number of electrons involved in a reaction "n" was calculated with the following equation; n=4$I_D$/($I_D$+($I_R$/N)). In this equation, $I_D$ and $I_R$ represent a disk current and a ring current at a potential of 0 V, respectively. In addition, N represents collection efficiency. The collection efficiency was set to 0.372256.

FIG. 2 illustrates the results of evaluation of each of the carbon catalysts for its OCV (V), 0.2-A voltage (V), $E_{O2}$ (V), and number of electrons involved in a reaction. As illustrated in FIG. 2, the power generation performance and oxygen reduction activity in the case of using any one of the carbon catalysts subjected to the metal impregnation treatment (Examples 1 to 12) were improved compared to those in the case of using any one of the carbon catalysts not subjected to the metal impregnation treatment (Comparative Examples 1 and 2).

Further, the power generation performance and oxygen reduction activity in the case of using any one of the carbon catalysts subjected to the acid washing after the metal impregnation treatment (Examples 3 to 12) were improved compared to those in the case of using any one of the carbon catalysts not subjected to the acid washing (Examples 1 and 2). In particular, the power generation performance in the case of using any one of the carbon catalysts subjected to the additional metal impregnation treatment using zirconium, titanium, or cerium (Examples 7 to 9) was remarkably high. In addition, the power generation performance in the case of using the carbon catalyst into which nitrogen atoms had been doped (Example 12) was also remarkably high.

In addition, the number of electrons involved in a reaction in the case of using any one of the carbon catalysts not subjected to the metal impregnation treatment (Comparative Examples 1 and 2) was 3.6. On the other hand, the number of electrons involved in a reaction in the case of using any one of the carbon catalysts subjected to the metal impregnation treatment (Examples 1 to 12) was 3.8 or 3.9, which was large.

[Evaluation by Temperature Programmed Desorption Method]

The carbon catalysts produced in Examples 3, 4, 7, 10, and 12 and Comparative Example 1 above, and the ketjen black (KB) prepared in Comparative Example 3 above, were each evaluated by a temperature programmed desorption method. That is, a carbon catalyst was placed in a temperature programmed desorption apparatus (manufactured by BEL Japan, Inc.), the carbon catalyst was heated under such a high vacuum that a carrier gas (He) was caused to flow at 50 mL/min, and a desorbed gas was subjected to measurement with a quadrupole mass spectrometer (QMS).

Specifically, first, the carbon catalyst was subjected to a pretreatment (desorption of a catalyst surface functional group by a heat treatment). That is, 0.02 g of the carbon catalyst was loaded into the central portion of a reaction tube made of quartz, and then the tube was set in the temperature programmed desorption apparatus. The temperature in the apparatus was increased to 50° C. at a rate of temperature increase of 5° C./min and then held at the temperature for 40 minutes so that the apparatus was stabilized. After that, the carbon catalyst was subjected to the heat treatment by heating the carbon catalyst to increase its temperature to 900° C. at a rate of temperature increase of 10° C./min. Thus, the functional group on its surface was desorbed.

Next, the surface of the carbon catalyst was caused to adsorb oxygen. That is, first, the temperature in the apparatus was held at 150° C. for 10 minutes so that the apparatus was stabilized. After that, an oxygen ($O_2$) gas was caused to flow through the carbon catalyst subjected to the heat treatment as described above so as to have a concentration of 5 vol %, and then the carbon catalyst was held at 150° C. for 20 minutes so that the surface of the carbon catalyst (mainly an edge surface) was caused to chemically adsorb oxygen.

Next, the carbon catalyst was subjected to a heat treatment, and then desorbed carbon monoxide (CO) and carbon dioxide ($CO_2$) were subjected to measurement. That is, a helium (He) gas was made to flow in the apparatus at 150° C. for 25 minutes so that oxygen that had not chemically adsorbed was deaerated. Next, the temperature in the apparatus was increased from 150° C. to 900° C. at a rate of temperature increase of 10° C./min again. During the temperature increase, the helium (He) gas was made to flow at 50 mL/min, carbon monoxide and carbon dioxide produced by the desorption of an oxygen-containing compound were detected, and a correlation between a temperature (axis of abscissa) and a detected intensity (axis of ordinate) was recorded.

Then, the amounts of desorbed carbon monoxide and carbon dioxide were determined. That is, the integral values (detected intensity areas) of the detected intensities of carbon monoxide and carbon dioxide from 150° C., at which the heat treatment was initiated, to the temperature (400° C. or 900° C.) at which one wished to determine the amounts, were each calculated. Meanwhile, a calibration curve illustrating a correlation between the desorption amount of each of carbon monoxide and carbon dioxide, and its detected intensity area was created by using a predetermined amount of calcium oxalate monohydrate ($CaC_2O_4.H_2O$) as a reference substance. Specifically, the calibration curve was obtained by subjecting 0.02 g of a sample, which was obtained by mixing alumina and calcium oxalate monohydrate ($CaC_2O_4.H_2O$) so that the content of calcium oxalate was 250, 500, 750, or 1,000 µmol, to a heat treatment under the conditions described above. Then, the desorption amounts (release amounts) of carbon monoxide and carbon dioxide from the carbon catalyst were determined on the basis of the detected intensity areas obtained by the measurement and the calibration curve.

FIG. 3 illustrates the results of evaluation of each of the carbon catalysts for its desorption amounts of carbon monoxide and carbon dioxide in the temperature programmed desorption method from 150° C. to 400° C. or 900° C. As illustrated in FIG. 3, the desorption amounts in each of the carbon catalysts (Examples 3, 4, 7, 10, and 12) subjected to the metal impregnation treatment were remarkably larger than those in each of the carbon catalyst (Comparative Example 1) and the electrically conductive carbon material (Comparative Example 3) not subjected to the metal impregnation treatment. That is, the metal impregnation treatment remarkably increased the desorption amounts of carbon monoxide and carbon dioxide in the temperature programmed desorption method.

The results show that the metal impregnation treatment increased the amount of the edge surfaces of carbon in the carbon catalyst, i.e., increased its active surface area. Thus, the improvements in the power generation performance and oxygen reduction activity of the carbon catalyst through the metal impregnation treatment were considered to be probably due to an increase in the amount of the edge surfaces (increase in the active surface area) as a result of the metal impregnation treatment.

[Evaluation of Average La, Average Lc, and Average Number of Stacks]

The carbon catalysts produced in Examples 3, 4, and 10, and Comparative Example 1, and the ketjen black (KB) prepared in Comparative Example 3, were each determined for its average crystallite sizes (average La and average Lc) and average number of stacks in a c-axis direction of a carbon network surface.

The average La, average Lc, and average number of stacks were calculated by analysis of a powder X-ray diffraction pattern of the carbon catalyst by a Diamond method. For this analysis, there was used software for analysis (Carbon Analyzer D series, Hiroyuki Fujimoto, http://www.asahi-net.or.jp/~qn6h-fjmt/) installed in a computer.

FIG. 4 illustrates the results of evaluation of each of the carbon catalysts for its average La, average Lc, and average number of stacks. As illustrated in FIG. 4, there was no marked difference in any of the average La, the average Lc, and the average number of stacks between Examples and Comparative Examples. That is, the average La, the average Lc, and the average number of stacks had no clear correlation with the improvements in the power generation performance and the oxygen reduction activity.

In addition, the carbon catalysts subjected to the metal impregnation treatment and the carbon catalysts not subjected to the metal impregnation treatment each had its specific surface area determined by a nitrogen adsorption BET method. As a result, the specific surface area fell within the range of 450 $m^2/g$ or more and 650 $m^2/g$ or less in any of the carbon catalysts, and there was no marked difference between the carbon catalysts.

In addition, the carbon catalysts subjected to the metal impregnation treatment and the carbon catalysts not subjected to the metal impregnation treatment were each evaluated for its crystallinity. As a result, there was no marked difference between the carbon catalysts. As described above, the BET specific surface area and the crystallinity also had no clear correlation with the improvements in the power generation performance and oxygen reduction activity through the metal impregnation treatment.

[Evaluation of Oxygen Reduction Activity and Four-Electron Reduction Reaction Rate in Air Cell]

First, a catalyst slurry containing any one of carbon materials including the carbon catalysts produced in Examples 3 and 12 above, the ketjen black prepared in Comparative Example 3, and the carbon material carrying platinum prepared in Comparative Example 4, was prepared. That is, 1 µL of a commercially available binder (SBR TRD-2001 manufactured by JSR Corporation), 300 µL of ethanol, and 150 µL of distilled water were added to 5 mg of the carbon material, and the contents were mixed with a mortar. The resultant mixture was ultrasonicated for 1 hour. Thus, a catalyst slurry was obtained.

Then, the oxygen reduction activity was evaluated. That is, the catalyst slurry was aspirated with a pipette and applied onto a disk electrode (diameter: 5 mm) of a rotation ring-disk electrode apparatus (RRDE-1 SC-5 manufactured by Nikko Keisoku), followed by drying. Thus, a working electrode was produced. In addition, a platinum electrode was used as a ring electrode (counter electrode) and an Ag/AgCl electrode was used as a reference electrode. A 1 mol/$dm^3$KOH aqueous solution having dissolved therein oxygen at normal temperature was used as an electrolyte solution.

Next, in the electrolyte solution, the electrodes were rotated at a rotational speed of 1,500 rpm, the potential of the ring electrode was set to 0.4 V, and a current density during potential sweep from 0.2 V to −0.5 V at a sweep speed of 0.5 mV/sec was recorded as a function of a potential.

Further, a four-electron reduction reaction rate E4 (%) was calculated with the following equation; E4={$(I_D-I_R/N)$}/{$(I_D+I_R/N)$}×100. In this equation, $I_D$ and $I_R$ represent a disk current and a ring current at a potential of 0 V, respectively. In addition, N represents collection efficiency. The collection efficiency was set to 0.372256.

Figure 6:
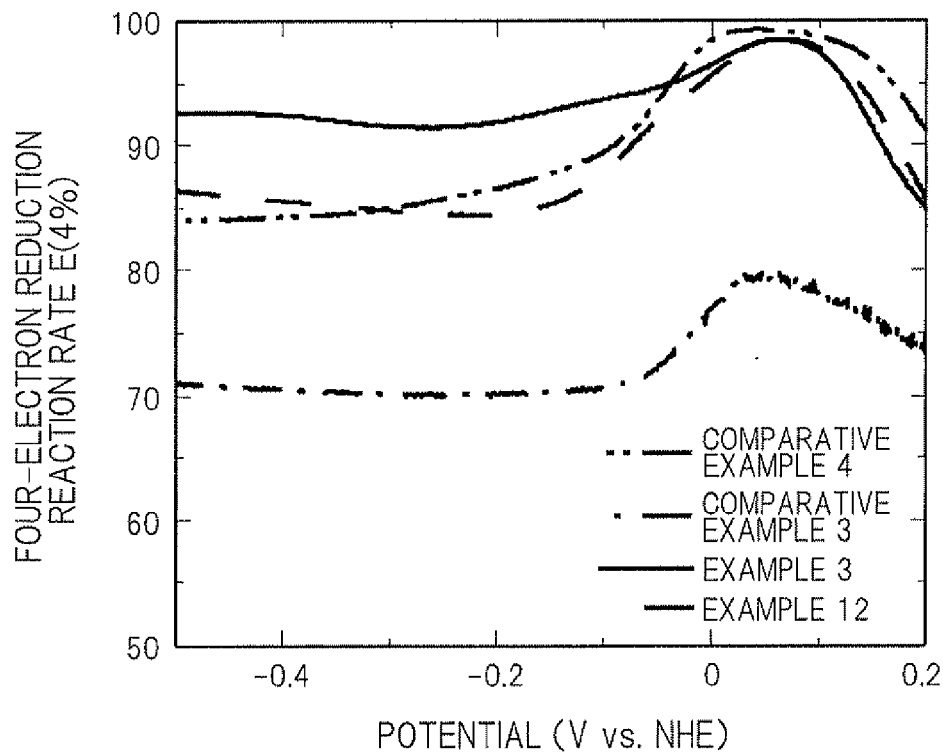
FIG. 6 is an explanatory diagram illustrating an example of results of evaluation of a four-electron reduction reaction rate of an oxygen reduction reaction with a carbon catalyst in an embodiment of the present invention.

FIG. 5 illustrates the results of evaluation of the oxygen reduction activity. In FIG. 5, the axis of abscissa indicates the potential (V vs. NHE) and the axis of ordinate indicates the current density (mA/cm$^2$). In addition, FIG. 6 illustrates the results of evaluation of the four-electron reduction reaction rate E4. In FIG. 6, the axis of abscissa indicates the potential (V vs. NHE) and the axis of ordinate indicates the four-electron reduction reaction rate E4 (%). In FIG. 5 and FIG. 6, the result in the case of using the carbon catalyst produced in Example 3 (PCoFeAW) is indicated by a solid line, the result in the case of using the carbon catalyst produced in Example 12 (PCoFeAWNH$_3$) is indicated by a dashed line, the result in the case of using the ketjen black (KB) prepared in Comparative Example 3 is indicated by a chain-dashed line, and the result in the case of using the carbon material carrying platinum (Pt/C) prepared in Comparative Example 4 is indicated by a chain double-dashed line.

As illustrated in FIG. 5, the carbon catalysts produced in Example 3 and Example 12 each exhibited an oxygen reduction activity that was remarkably high compared to the ketjen black and was equivalent to the carbon material carrying platinum.

In addition, as illustrated in FIG. 6, the four-electron reduction reaction rate E4 obtained in the case of using any one of the carbon catalysts produced in Example 3 and Example 12 was remarkably high compared to that in the case of using the ketjen black, and was equivalent to or higher than that in the case of using the carbon material carrying platinum. In particular, the four-electron reduction reaction rate E4 obtained in the case of using the carbon catalyst produced in Example 3 was higher than that in the case of using the carbon material carrying platinum in the potential range of 0 V to −0.5 V.

The invention claimed is:

1. A method of producing a carbon catalyst, comprising:
   a carbonization step of carbonizing raw materials containing an organic compound as a carbon source, a metal, and an electrically conductive carbon material to produce a carbonized material;
   a metal impregnation step of impregnating the carbonized material with a metal; and
   a heat treatment step of subjecting the carbonized material impregnated with the metal to a heat treatment.

2. The method of producing a carbon catalyst according to claim 1, wherein the metal impregnation step comprises impregnating the carbonized material with a different kind of metal from the metal in the raw materials.

3. The method of producing a carbon catalyst according to claim 1, wherein the heat treatment step comprises heating the carbonized material at 400° C. or more.

4. The method of producing a carbon catalyst according to claim 2, wherein the heat treatment step comprises heating the carbonized material at 400° C. or more.

5. The method of producing a carbon catalyst according to claim 1, wherein the metal in the metal impregnation step is one or two or more kinds selected from the group consisting of titanium, chromium, manganese, iron, cobalt, nickel, copper, zinc, zirconium, niobium, molybdenum, lanthanum, cerium, and tantalum.

6. The method of producing a carbon catalyst according to claim 2, wherein the metal in the metal impregnation step is one or two or more kinds selected from the group consisting of titanium, chromium, manganese, iron, cobalt, nickel, copper, zinc, zirconium, niobium, molybdenum, lanthanum, cerium, and tantalum.

7. The method of producing a carbon catalyst according to claim 3, wherein the metal in the metal impregnation step is one or two or more kinds selected from the group consisting of titanium, chromium, manganese, iron, cobalt, nickel, copper, zinc, zirconium, niobium, molybdenum, lanthanum, cerium, and tantalum.

* * * * *